US00RE47645E

(19) United States
(12) Reissued Patent
Peron

(10) Patent Number: US RE47,645 E
(45) Date of Reissued Patent: Oct. 15, 2019

(54) MEDICAL DRESSING

(71) Applicant: Smith & Nephew PLC, Watford, Hertfordshire (GB)

(72) Inventor: Yannick Louis Peron, East Yorkshire (GB)

(73) Assignee: Smith & Nephew PLC, Watford (GB)

(21) Appl. No.: 29/639,290

(22) Filed: Mar. 5, 2018

Related U.S. Patent Documents

Reissue of:
(64) Patent No.: Des. 679,820
Issued: Apr. 9, 2013
Appl. No.: 29/389,783
Filed: Apr. 15, 2011

U.S. Applications:
(60) Continuation of application No. 29/548,270, filed on Dec. 11, 2015, now Pat. No. Re. 46,778, which is a division of application No. 29/510,717, filed on Dec. 2, 2014, now Pat. No. Re. 46,289, which is an application for the reissue of Pat. No. Des. 679,820.

(30) Foreign Application Priority Data

Oct. 15, 2010 (GB) ..... 4017442
Oct. 15, 2010 (GB) ..... 4017443

(51) LOC (12) Cl. ..... 24-04
(52) U.S. Cl.
USPC ..... D24/184
(58) Field of Classification Search
USPC ..... D24/189
CPC ..... A61F 13/02; A61M 1/009; A61M 27/00; A61M 1/0088
See application file for complete search history.

(56) References Cited

U.S. PATENT DOCUMENTS 2,613,696 A * 10/1952 MacIntyre ..... 139/418
2,682,873 A 7/1954 Evans et al.
3,342,183 A * 9/1967 Edenbaum ..... 604/307
D267,510 S * 1/1983 Golub ..... D24/189
4,564,010 A * 1/1986 Coughlan et al. ..... 604/307
4,587,146 A * 5/1986 Anhauser et al. ..... 428/42.2
4,627,429 A * 12/1986 Tsuk ..... 604/307
D292,826 S * 11/1987 Sproles ..... D24/189
4,808,172 A * 2/1989 Murata ..... 604/306
4,917,112 A * 4/1990 Kalt ..... A61F 13/023 128/888
5,052,381 A * 10/1991 Gilbert et al. ..... 602/52
5,056,510 A * 10/1991 Gilman ..... 602/52
5,176,663 A 1/1993 Svedman et al.
5,266,371 A * 11/1993 Sugii et al. ..... 428/41.5
D352,782 S * 11/1994 Kirk et al. ..... D24/189
D357,742 S * 4/1995 Peery et al. ..... D24/189
5,437,651 A 8/1995 Todd et al.
D362,505 S * 9/1995 Fabricant ..... D24/189
D369,907 S * 5/1996 Sayovitz et al. ..... D5/53
D370,127 S * 5/1996 Bonaddio et al. ..... D5/58
D372,098 S * 7/1996 Lattin et al. ..... D24/189
5,549,584 A 8/1996 Gross
5,636,643 A 6/1997 Argenta et al.
5,645,081 A 7/1997 Argenta et al.
D382,343 S * 8/1997 Wandell et al. ..... D24/189
D384,745 S * 10/1997 Lattin et al. ..... D24/189
D385,038 S * 10/1997 Shultz ..... D24/189
D389,581 S * 1/1998 Fein ..... D24/189
5,998,694 A * 12/1999 Jensen et al. ..... 602/57
D424,699 S * 5/2000 Allen ..... D24/189
6,071,267 A 6/2000 Zamierowski
6,142,982 A 11/2000 Hunt et al.
6,345,623 B1 2/2002 Heaton et al.
D477,086 S * 7/2003 Tsuruda et al. ..... D24/189
6,648,862 B2 11/2003 Watson
6,685,681 B2 2/2004 Lockwood et al.
6,752,794 B2 6/2004 Lockwood et al.
D495,056 S * 8/2004 Watanabe ..... D24/189
6,936,037 B2 8/2005 Bubb et al.
D509,299 S * 9/2005 Watanabe ..... D24/189
6,951,553 B2 10/2005 Bubb et al.
7,004,915 B2 2/2006 Boynton et al.
7,108,683 B2 9/2006 Zamierowski
7,195,624 B2 3/2007 Lockwood et al.
D571,922 S * 6/2008 Freeland ..... D24/189
7,381,859 B2 6/2008 Hunt et al.
D572,367 S * 7/2008 Freeland ..... D24/189
D572,824 S * 7/2008 Propp ..... D24/189
D572,825 S * 7/2008 Freeland ..... D24/189
7,438,705 B2 10/2008 Karpowicz et al.
7,569,742 B2 8/2009 Haggstrom et al.
D600,354 S * 9/2009 Sachi ..... D24/189
D604,424 S * 11/2009 Coubetergues ..... D24/189
7,615,036 B2 11/2009 Joshi et al.

(New)

| | | | | |
|---|---|---|---|---|
| D605,299 | S * | 12/2009 | Iwahashi et al. | D24/189 |
| 7,645,269 | B2 | 1/2010 | Zamierowski | |
| D609,922 | S * | 2/2010 | Bridges et al. | D5/53 |
| 7,722,582 | B2 | 5/2010 | Lina et al. | |
| D618,810 | S * | 6/2010 | Tanigawa et al. | D24/189 |
| D620,122 | S * | 7/2010 | Cotton | D24/189 |
| D620,123 | S * | 7/2010 | Igwebuike | D24/189 |
| 7,759,537 | B2 | 7/2010 | Bishop et al. | |
| 7,759,539 | B2 | 7/2010 | Shaw et al. | |
| 7,776,028 | B2 | 8/2010 | Miller et al. | |
| 7,779,625 | B2 | 8/2010 | Joshi et al. | |
| 7,794,438 | B2 | 9/2010 | Henley et al. | |
| D625,017 | S * | 10/2010 | Iwahashi et al. | D24/189 |
| D625,018 | S * | 10/2010 | Smith et al. | D24/189 |
| D631,166 | S * | 1/2011 | Leffew et al. | D24/189 |
| 7,959,624 | B2 | 6/2011 | Riesinger | |
| 7,964,766 | B2 | 6/2011 | Blott et al. | |
| 7,976,519 | B2 | 7/2011 | Bubb et al. | |
| D642,594 | S | 8/2011 | Mattson et al. | |
| 8,080,702 | B2 | 12/2011 | Blott et al. | |
| 8,152,785 | B2 | 4/2012 | Vitaris | |
| 8,361,043 | B2 * | 1/2013 | Hu | A61F 5/4401 604/319 |
| 8,372,049 | B2 | 2/2013 | Jaeb et al. | |
| D679,819 | S * | 4/2013 | Peron | D24/189 |
| D679,820 | S * | 4/2013 | Peron | D24/189 |
| 8,540,699 | B2 | 9/2013 | Miller et al. | |
| D705,428 | S * | 5/2014 | Cheney | D24/169 |
| D705,429 | S * | 5/2014 | Cheney | D24/169 |
| 8,715,256 | B2 | 5/2014 | Greener | |
| 8,764,732 | B2 | 7/2014 | Hartwell | |
| 8,801,685 | B2 | 8/2014 | Armstrong et al. | |
| 8,808,274 | B2 | 8/2014 | Hartwell | |
| D713,967 | S * | 9/2014 | Adoni | D24/189 |
| 8,864,748 | B2 | 10/2014 | Coulthard et al. | |
| 9,061,095 | B2 | 6/2015 | Adie et al. | |
| RE45,864 | E | 1/2016 | Peron | |
| 2004/0241214 | A1 | 12/2004 | Kirkwood et al. | |
| 2006/0009744 | A1 | 1/2006 | Erdman et al. | |
| 2008/0167593 | A1 | 7/2008 | Fleischmann | |
| 2009/0227969 | A1 | 9/2009 | Jaeb et al. | |
| 2009/0240185 | A1 | 9/2009 | Jaeb et al. | |
| 2009/0281471 | A1 * | 11/2009 | Iwahashi et al. | 602/54 |
| 2009/0293887 | A1 | 12/2009 | Wilkes et al. | |
| 2009/0299340 | A1 | 12/2009 | Kazala et al. | |
| 2009/0299341 | A1 | 12/2009 | Kazala et al. | |
| 2009/0312728 | A1 | 12/2009 | Randolph et al. | |
| 2010/0069858 | A1 | 3/2010 | Olson | |
| 2010/0069863 | A1 | 3/2010 | Olson | |
| 2010/0069885 | A1 | 3/2010 | Stevenson et al. | |
| 2010/0121286 | A1 | 5/2010 | Locke et al. | |
| 2010/0122417 | A1 | 5/2010 | Vrzalik et al. | |
| 2010/0125258 | A1 | 5/2010 | Coulthard et al. | |
| 2010/0210986 | A1 | 8/2010 | Sanders | |
| 2010/0268198 | A1 | 10/2010 | Buan et al. | |
| 2010/0305490 | A1 | 12/2010 | Coulthard et al. | |
| 2010/0305526 | A1 | 12/2010 | Robinson et al. | |
| 2010/0305549 | A1 | 12/2010 | Miller et al. | |
| 2010/0324510 | A1 | 12/2010 | Anderson et al. | |
| 2011/0028918 | A1 | 2/2011 | Hartwell | |
| 2011/0054421 | A1 | 3/2011 | Hartwell | |
| 2011/0054423 | A1 | 3/2011 | Blott et al. | |
| 2011/0087179 | A2 | 4/2011 | Blott et al. | |
| 2011/0092927 | A1 | 4/2011 | Wilkes et al. | |
| 2011/0106030 | A1 | 5/2011 | Scholz | |
| 2011/0112492 | A1 | 5/2011 | Bharti et al. | |
| 2011/0172615 | A2 | 7/2011 | Greener | |

FOREIGN PATENT DOCUMENTS

| | | | |
|---|---|---|---|
| EP | 0 619 105 | A1 | 10/1994 |
| EP | 2 098 257 | A1 | 9/2009 |
| EP | 2 335 749 | A1 | 6/2011 |
| WO | WO 99/01173 | A1 | 1/1999 |
| WO | WO 1999/001173 | | 1/1999 |
| WO | WO 01/85248 | A1 | 11/2001 |
| WO | WO 2001/85248 | | 11/2001 |
| WO | WO 2009/019227 | | 2/2009 |
| WO | WO 2009/019229 | | 2/2009 |
| WO | WO 2009/103031 | | 8/2009 |
| WO | WO 2009/111657 | | 9/2009 |
| WO | WO 2010/033574 | | 3/2010 |
| WO | WO 2010/033574 | A1 | 3/2010 |
| WO | WO 2010/035017 | | 4/2010 |
| WO | WO 2010/072395 | | 7/2010 |
| WO | WO 2010/147533 | | 12/2010 |
| WO | WO 2010/147533 | A1 | 12/2010 |
| WO | WO 2011/019476 | | 2/2011 |
| WO | WO 2011/019476 | A1 | 2/2011 |
| WO | WO 2011/023275 | | 3/2011 |
| WO | WO 2011/023275 | A1 | 3/2011 |

OTHER PUBLICATIONS

Allevyn Educational Booklet, Smith & Nephew Medical Ltd, Apr. 2014.
Allevyn Wound Dressings Pamphlet, Smith & Nephew, Inc., 2008.
KCI Licensing, Prevena™ Incision Management System, Jan. 2010.
KCI Licensing, Prevena™ Incision Management System Patient Guide, Jan. 2010.
KCI, Prevena™ Incision Management System Clinician Guide, Jan. 2010.
Teder et al., "Continuous Wound Irrigation in the Pig," Journal of Investigative Surgery, vol. 3, 1990, pp. 399-407.
U.S. Appl. No. 29/389,782, filed Apr. 15, 2011, Peron.
U.S. Appl. No. 13/092,042, filed Apr. 21, 2011.

* cited by examiner

*Primary Examiner* — Darlington Ly
(74) *Attorney, Agent, or Firm* — Knobbe, Martens, Olson & Bear, LLP

(57) CLAIM

The ornamental design for a medical dressing, as shown and described.

DESCRIPTION

[FIG. 1 is a perspective top view of one embodiment of a medical dressing.]
[FIG. 2 is another perspective top view of the medical dressing of FIG. 1.]
[FIG. 3 is a top plan view of the medical dressing of FIG. 1.]
[FIG. 4 is a bottom view of the medical dressing of FIG. 1.]
[FIG. 5 is a far side view of the medical dressing of FIG. 1.]
[FIG. 6 is near side view of the medical dressing of FIG. 1.]
[FIG. 7 is a front view of the medical dressing of FIG. 1; and,]
[FIG. 8 is a rear view of the medical dressing of FIG. 1.]
*FIG. 9 is a top, right-side, and front perspective view of a medical dressing.*
*FIG. 10 is a top, right-side, and rear perspective top view of the medical dressing of FIG. 9.*
*FIG. 11 is a top plan view of the medical dressing of FIG. 9.*
*FIG. 12 is a bottom plan view of the medical dressing of FIG. 9.*
*FIG. 13 is a left side elevation view of the medical dressing of FIG. 9.*
*FIG. 14 is a right side elevation view of the medical dressing of FIG. 9.*
*FIG. 15 is a front elevation view of the medical dressing of FIG. 9; and,*
*FIG. 16 is a rear elevation view of the medical dressing of FIG. 9.*

*The broken lines in the drawings illustrate portions of the medical dressing that form no part of the claimed design.*

1 Claim, 16 Drawing Sheets

Figure 1:
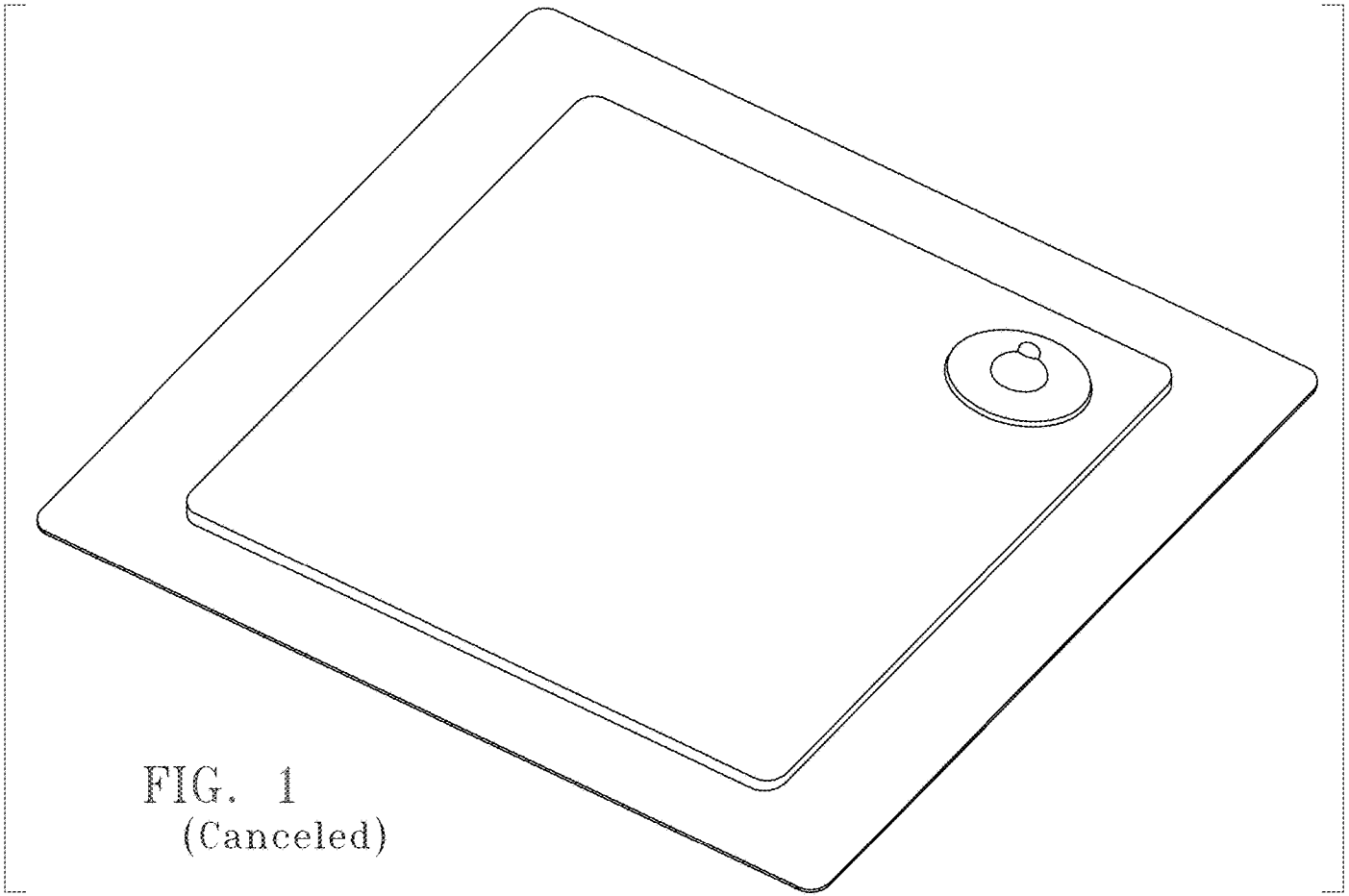
Figure 2:
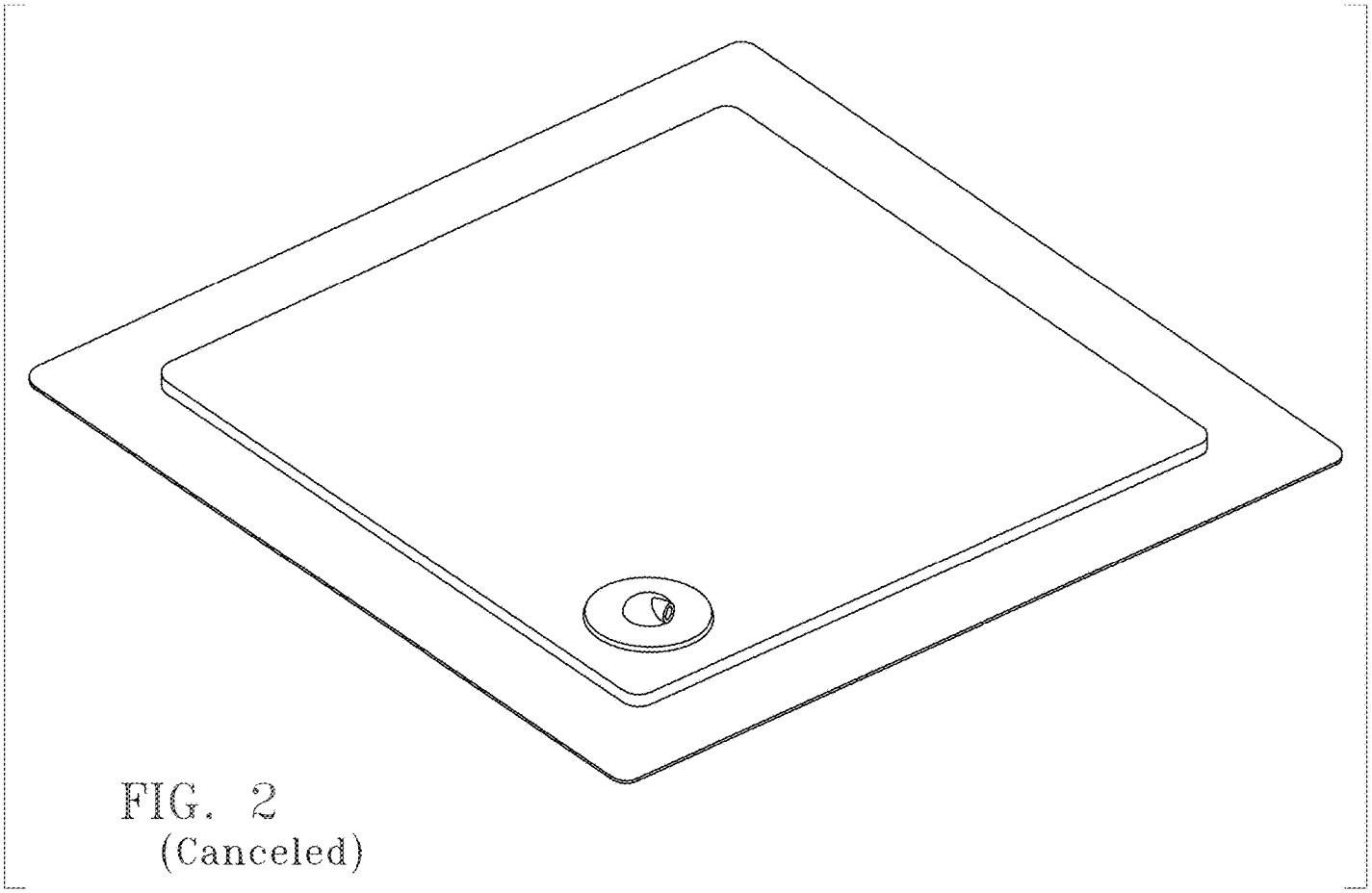
Figure 3:
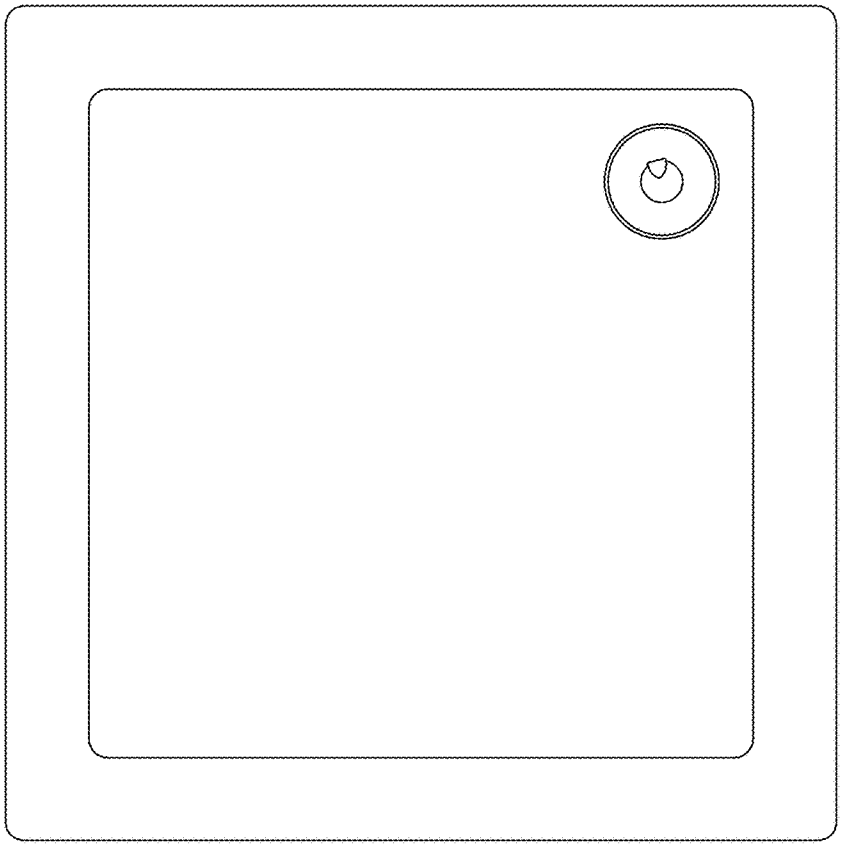
Figure 4:
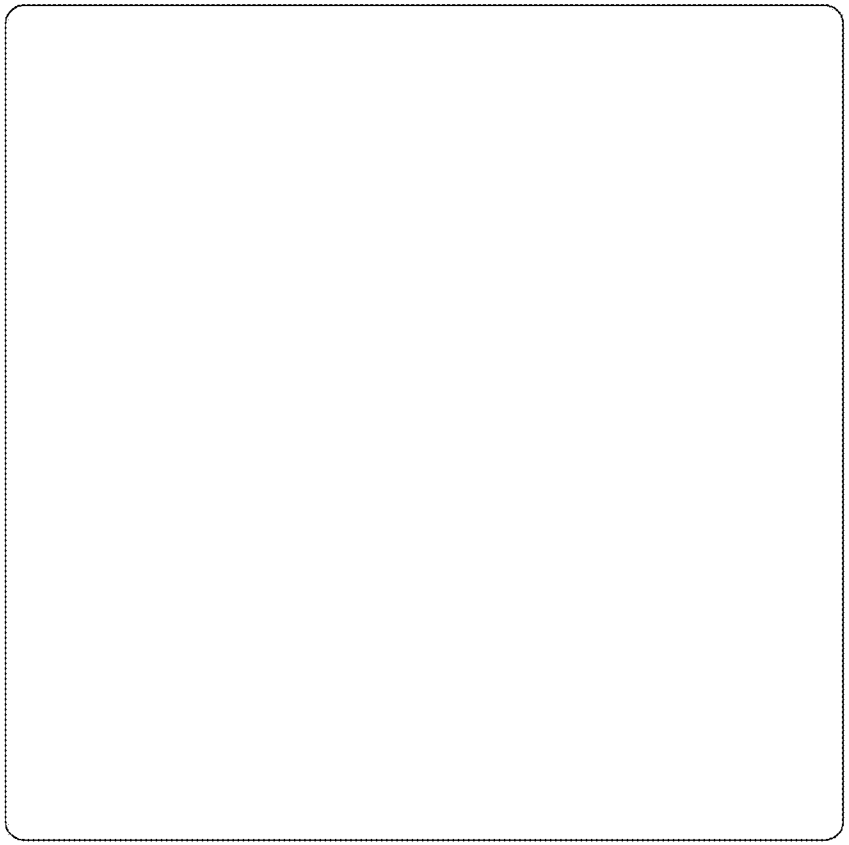
Figure 5:
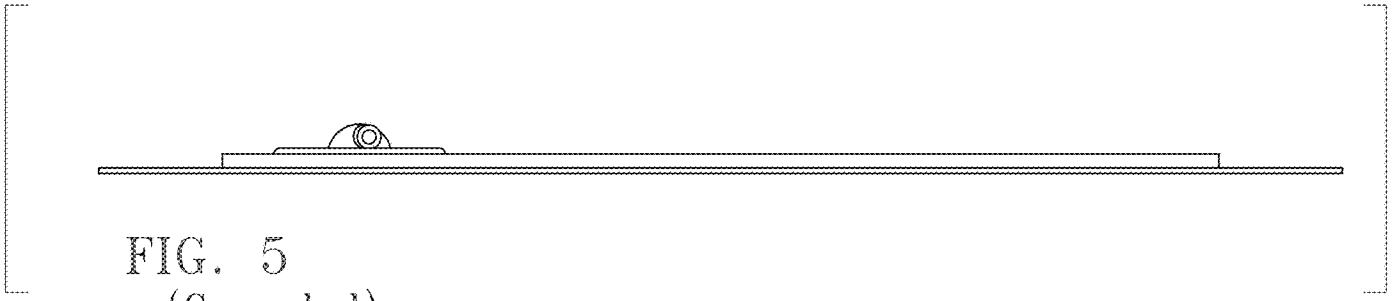
Figure 6:
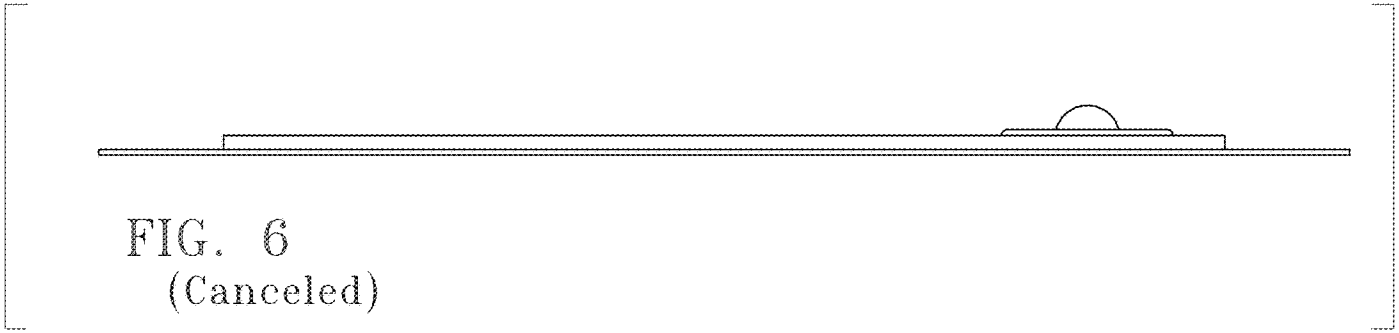
Figure 7:
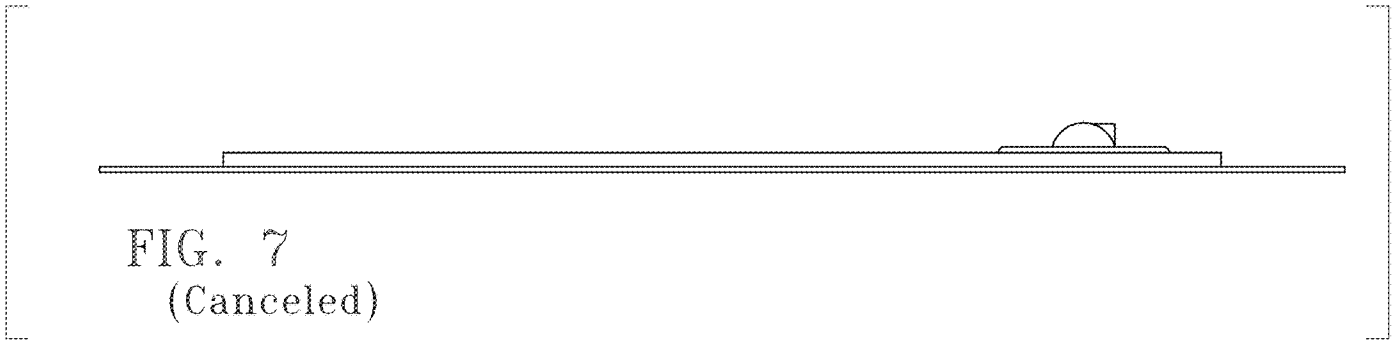
Figure 8:
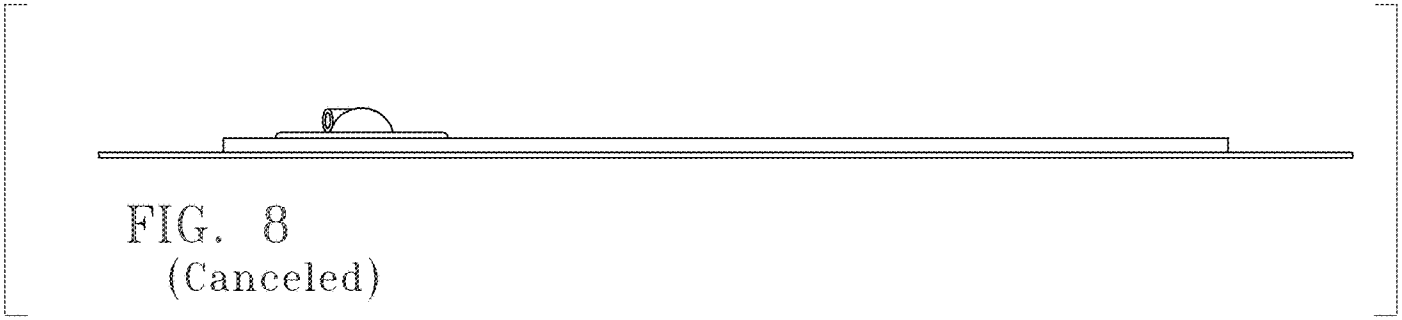

Matter enclosed in heavy brackets [ ] appears in the original patent but forms no part of this reissue; matter printed in italics indicates the additions made by reissue.

(Canceled)

(Canceled)

(Canceled)

(Canceled)

(Canceled)

(Canceled)

(Canceled)

(Canceled)

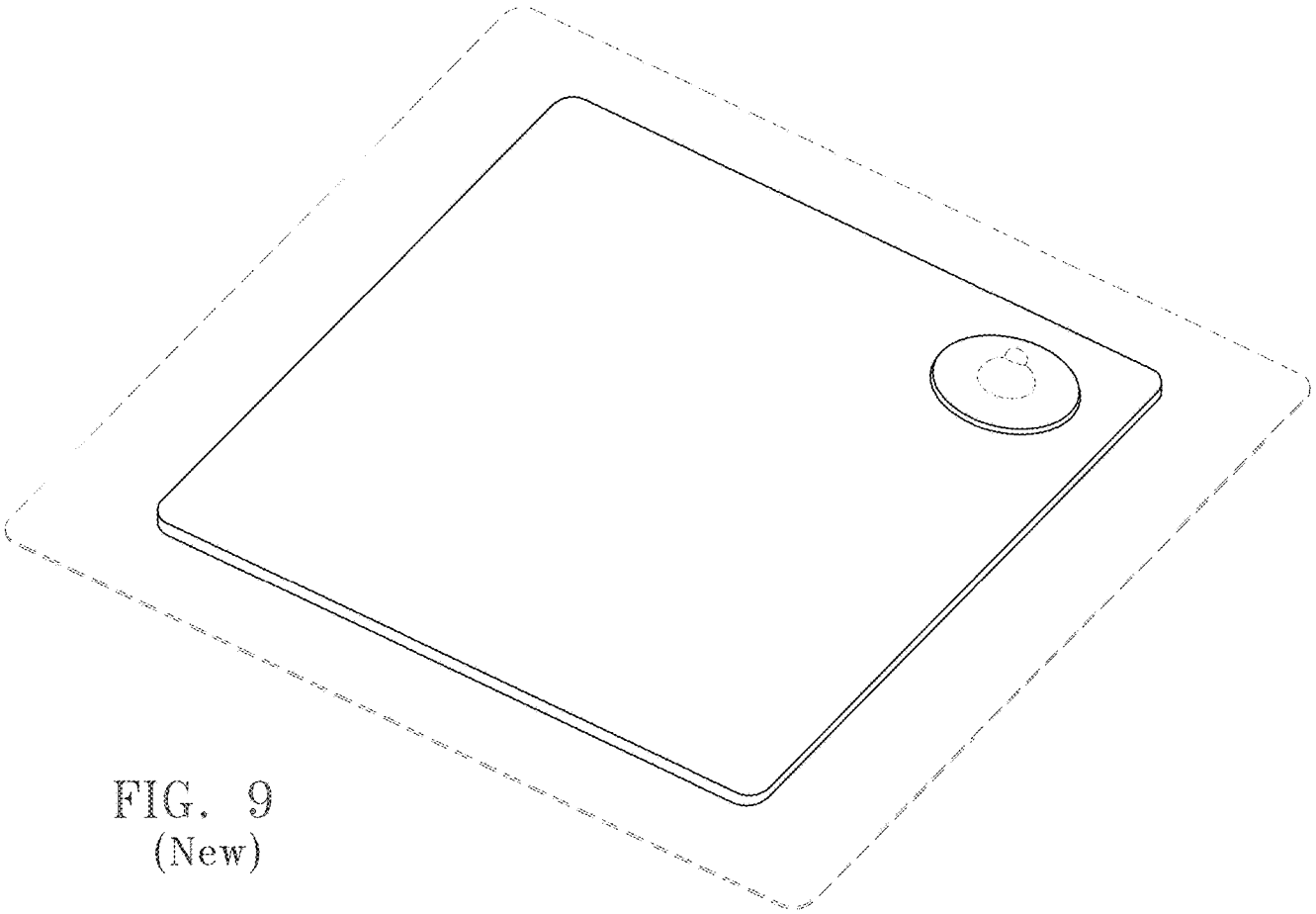
FIG. 9
(New)

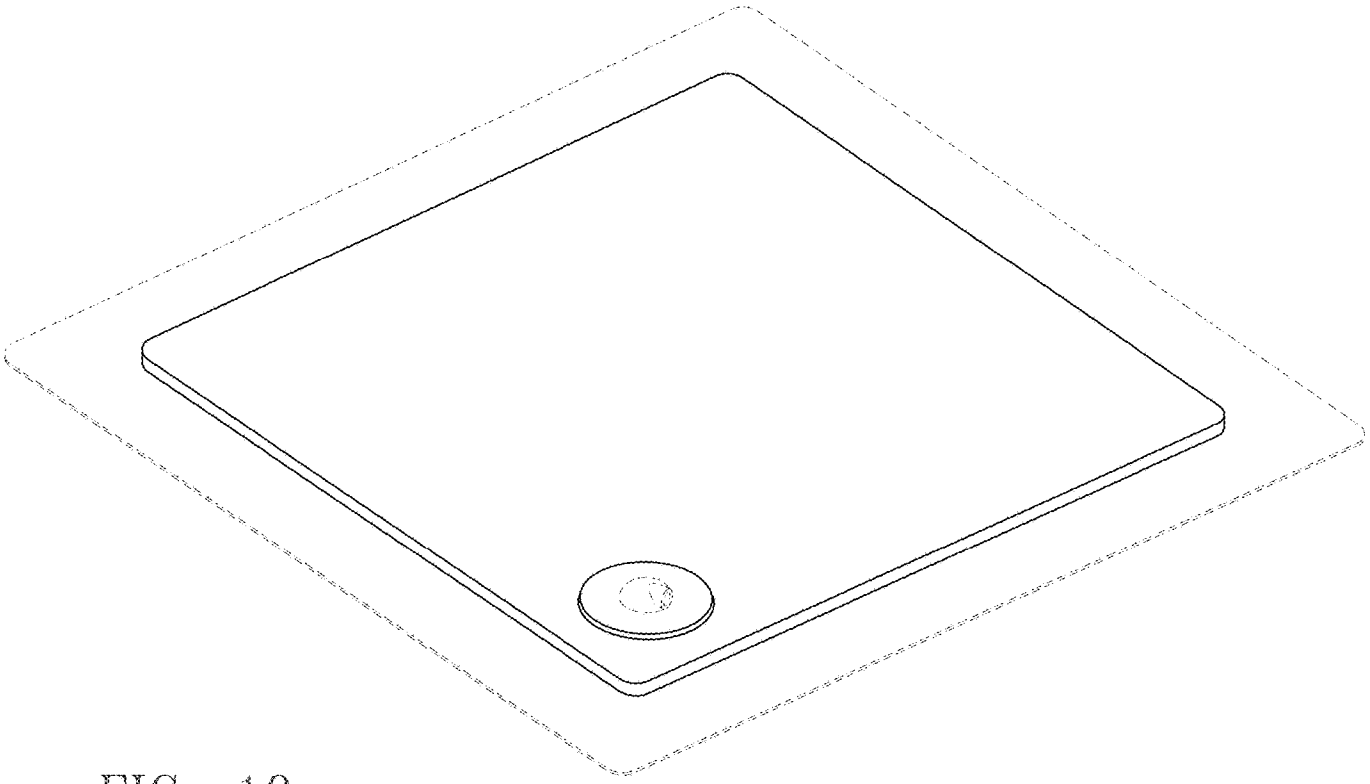
FIG. 10
(New)

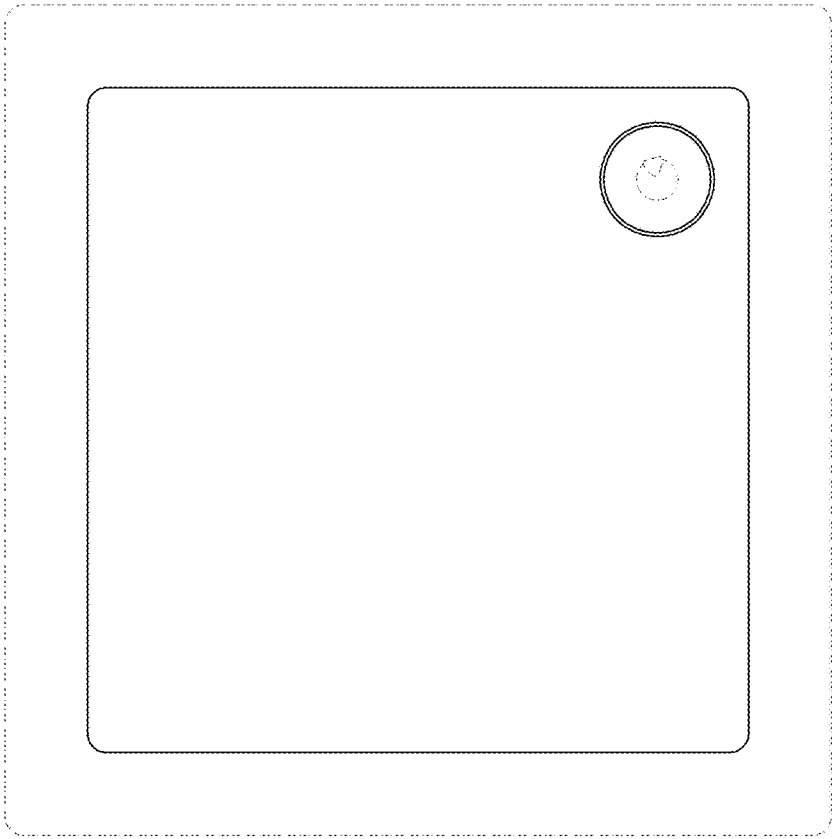
FIG. 11
(New)

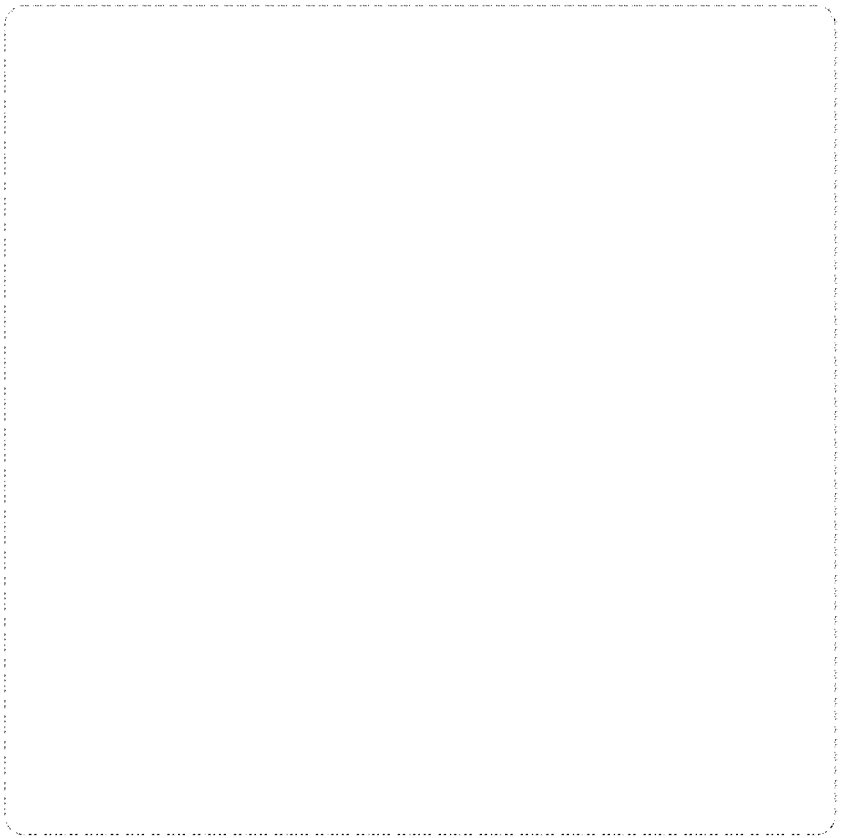
FIG. 12
(New)

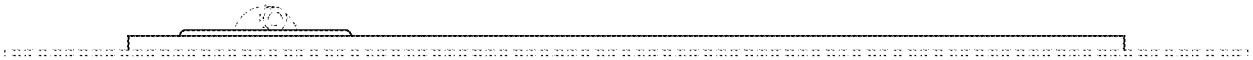
FIG. 13
(New)

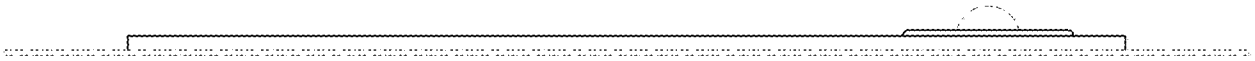
FIG. 14
(New)

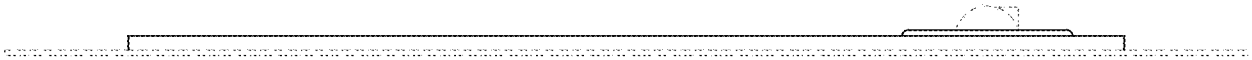
FIG. 15
(New)

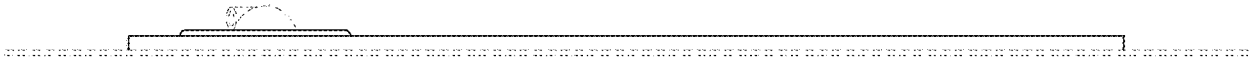
FIG. 16
(New)